(12) United States Patent
Lei et al.

(10) Patent No.: US 11,030,436 B2
(45) Date of Patent: Jun. 8, 2021

(54) OBJECT RECOGNITION

(71) Applicant: Hewlett-Packard Development Company, L.P., Spring, TX (US)

(72) Inventors: Yang Lei, Palo Alto, CA (US); Jian Fan, Palo Alto, CA (US); Jerry Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 52 days.

(21) Appl. No.: 16/606,171

(22) PCT Filed: Apr. 27, 2017

(86) PCT No.: PCT/US2017/029874
§ 371 (c)(1),
(2) Date: Oct. 17, 2019

(87) PCT Pub. No.: WO2018/199958
PCT Pub. Date: Nov. 1, 2018

(65) Prior Publication Data
US 2020/0125830 A1 Apr. 23, 2020

(51) Int. Cl.
*G06K 9/46* (2006.01)
*G06K 9/00* (2006.01)
(Continued)

(52) U.S. Cl.
CPC ....... *G06K 9/00214* (2013.01); *G06K 9/4671* (2013.01); *G06K 9/6215* (2013.01);
(Continued)

(58) Field of Classification Search
CPC . G06K 9/00201–00315; G06K 9/4671; G06K 9/6215; G06T 7/10; G06T 7/90;
(Continued)

(56) References Cited

U.S. PATENT DOCUMENTS 8,488,877 B1 * 7/2013 Owechko ........... G06K 9/00704
382/165
9,171,195 B1 10/2015 Rybakov
(Continued)

FOREIGN PATENT DOCUMENTS

WO WO-2016068869 A1 5/2016

OTHER PUBLICATIONS

Navalpakkam, Vidhya, et al. "Modeling the influence of task on attention." Vision research 45, No. 2 (2005): 205-231.
(Continued)

*Primary Examiner* — Sean T Motsinger
(74) *Attorney, Agent, or Firm* — Dicke Billig & Czaja PLLC

(57) ABSTRACT

A method of recognizing an object includes comparing a three-dimensional point cloud of the object to a three-dimensional candidate from a dataset to determine a first confidence score, and comparing color metrics of a two-dimensional image of the object to a two-dimensional candidate from the dataset to determine a second confidence score. The point cloud includes a color appearance calibrated from a white balance image, and the color appearance of the object is compared with the three-dimensional candidate. The first or second confidence score is selected to determine which of the three-dimensional candidate or the two-dimensional candidate corresponds with the object.

15 Claims, 3 Drawing Sheets

(51) Int. Cl.
*G06T 7/10* (2017.01)
*G06T 7/90* (2017.01)
*G06K 9/62* (2006.01)

(52) U.S. Cl.
CPC ............... *G06T 7/10* (2017.01); *G06T 7/90* (2017.01); *G06T 2200/04* (2013.01); *G06T 2207/10024* (2013.01); *G06T 2207/10028* (2013.01)

(58) Field of Classification Search
CPC ....... G06T 2200/04; G06T 2207/10024; G06T 2207/10028
See application file for complete search history.

(56) References Cited

U.S. PATENT DOCUMENTS

| | | | | |
|---|---|---|---|---|
| 9,183,459 | B1* | 11/2015 | Zhang | G06K 9/6293 |
| 9,286,538 | B1 | 3/2016 | Chen | |
| 9,483,707 | B2 | 11/2016 | Chen | |
| 10,915,793 | B2* | 2/2021 | Corral-Soto | G06K 9/6262 |
| 2010/0207936 | A1 | 8/2010 | Minear | |
| 2013/0004060 | A1* | 1/2013 | Bell | H04N 13/257 382/154 |
| 2015/0254499 | A1* | 9/2015 | Pang | G06T 7/001 382/103 |
| 2016/0364634 | A1 | 12/2016 | Davis | |
| 2018/0018502 | A1* | 1/2018 | Rao | H04W 4/023 |
| 2019/0088004 | A1* | 3/2019 | Lucas | G06K 9/6202 |
| 2019/0096086 | A1* | 3/2019 | Xu | G06K 9/00791 |
| 2020/0388004 | A1* | 12/2020 | Zhang | G06T 3/0075 |

OTHER PUBLICATIONS

Belahcene, M et al., Face Identification by Fusion Scores 2d Neutral and 3d Expressions, 2013,< http://ieeexplore.ieee.org/stamp/stamp.jsp?arnumber=6648860&tag=1 >.

Joongrock, K et al., Random-profiles-based 3d Face Recognition System, Apr. 2014 < https://www.ncbi.nlm.nih.gov/pmc/articles/PMC4029705/ >.

Liu, M. et al., Generic Object Recognition Based on the Fusion of 2D and 3D SIFT Descriptors, Jul. 6-9, 2015,< http://fs.gallup.unm.edu/GenericObjectRecognition.pdf >.

Soltana, W. B. et al., Comparison of 2d/3d Features and Their Adaptive Score Level Fusion for 3d Face Recognition, 2010 < http://liris.cnrs.fr/Documents/Liris-4749.pdf >.

* cited by examiner

OBJECT RECOGNITION

BACKGROUND

Object recognition and retrieval is an area of computer vision and image processing. In one application, a physical object can be converted into digital representations of the object, and the digital representation of the object can be converted into a physical article. The digital-to-physical transformation can be achieved via two-dimensional printing of data files using color or monotone printers or via three-dimensional printing or additive manufacturing of data files using three-dimensional printers. Object recognition can be used to retrieve data files and information associated with the object as well as for other content interaction.

DETAILED DESCRIPTION

Object recognition is a basis for many advanced applications including augmented reality, human-computer interaction, three-dimensional printing and others. Object recognition systems can learn different object classes or instances from a training dataset, where the training information includes a variety of examples of objects to be recognized. In cases of a new unlabeled query, the system can return an object class or name of a specific object or a notice that the object was not found.

Two-dimensional image instance recognition systems typically attempt to recognize a two-dimensional image from a set of known two-dimensional images. Object instance recognition is trained on images of the objects as seen from different viewing angles. For a single, three-dimensional object, these images can be different. Further, the number of positions of the object for training depends on the shape of the object and can be vast. Another limitation of two-dimensional object recognition is that mapping or projecting an object to a two-dimensional image causes information loss.

Three-dimensional depth data gathered with depth sensors provide rich object data in the form of real-time color-depth images as point clouds. Performance, however, depends on the quality of the data including noise level, resolution, and precision. In contrast to image sensors, different color-depth sensors have a large variation of characteristics. Three-dimensional color-depth sensors have difficulty in processing small objects, or objects that are black or shiny. Further, processing three-dimensional depth data can be computationally expensive relative to processing two-dimensional images.

An example system for object recognition includes a two-dimensional image pipeline and a three-dimensional point cloud pipeline. In one example, the pipelined operations are performed generally concurrently and a confidence score is assigned to each result. In one example, a fixed-sensor system performs a geometry calibration and a white balance correction including depth-based object segmentation to provide a color representation. Color representation can be applied in both pipelines.

Figure 1:
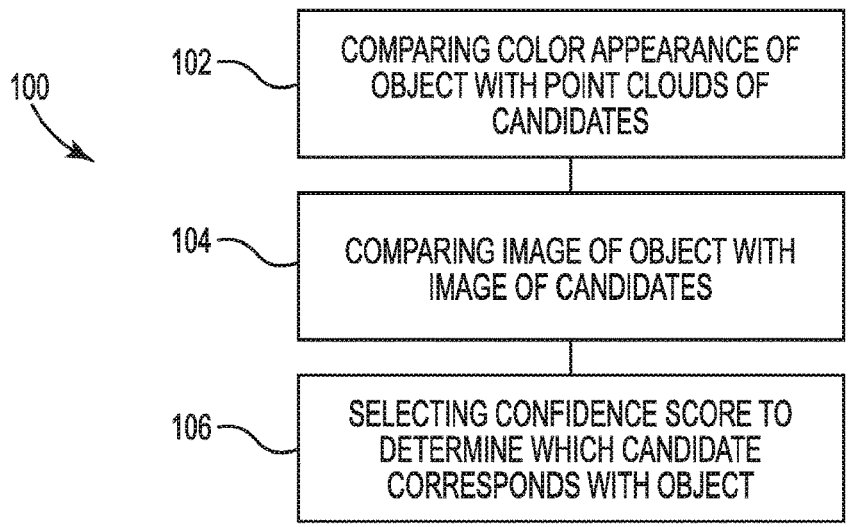
FIG. 1 is a block diagram illustrating an example of method of object recognition.

FIG. 1 illustrates a method 100 of recognizing an object. In one example, the object is compared against candidates in a dataset to determine a matching candidate. In this example, the dataset can include multiple candidates each having a three-dimensional point cloud and a two-dimensional image. A three-dimensional point cloud of the object is compared to a three-dimensional point cloud of a candidate from a dataset to determine a first confidence score at 102. The point cloud of the object includes a color appearance calibrated from a white balance image. The three-dimensional comparison at 102 includes comparing the color appearance of the three-dimensional point cloud of the object with the three-dimensional point cloud of the candidate. A two-dimensional image of the object is compared to a two-dimensional image of a candidate from the dataset to determine a second confidence score at 104. The two-dimensional comparison at 104 includes comparing the color metrics of the two-dimensional image of the object with the two-dimensional image of the candidate. In one example, the comparison at 102 and the comparison at 104 are performed generally concurrently and include a comparison of color metrics. If the highest-scoring candidate from the two-dimensional comparison at 104 matches the highest-scoring candidate from the three-dimensional comparison at 102, the likelihood is very high the object has been identified. If the highest-scoring candidate from the two-dimensional comparison at 104 does not match the highest-scoring candidate from the three-dimensional comparison at 102, however, one of the first and second confidence scores is selected to determine which of the three-dimensional candidate or the two-dimensional candidate corresponds with the object at 106. If the selected confidence score does not at least meet a threshold, the object has not been found in the candidate set.

The example method 100 can be implemented to include a combination of one or more hardware devices and computer programs for controlling a system, such as a computing system having a processor and memory, to perform method 100 to recognize the object. Method 100 can be implemented as a computer readable medium or computer readable device having set of executable instructions for controlling the processor to perform the method 100. Computer storage medium, or non-transitory computer readable medium, includes RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other storage medium that can be used to store the desired information and that can be accessed by a computing system. Accordingly, a propagating signal by itself does not qualify as storage media.

Figure 2:
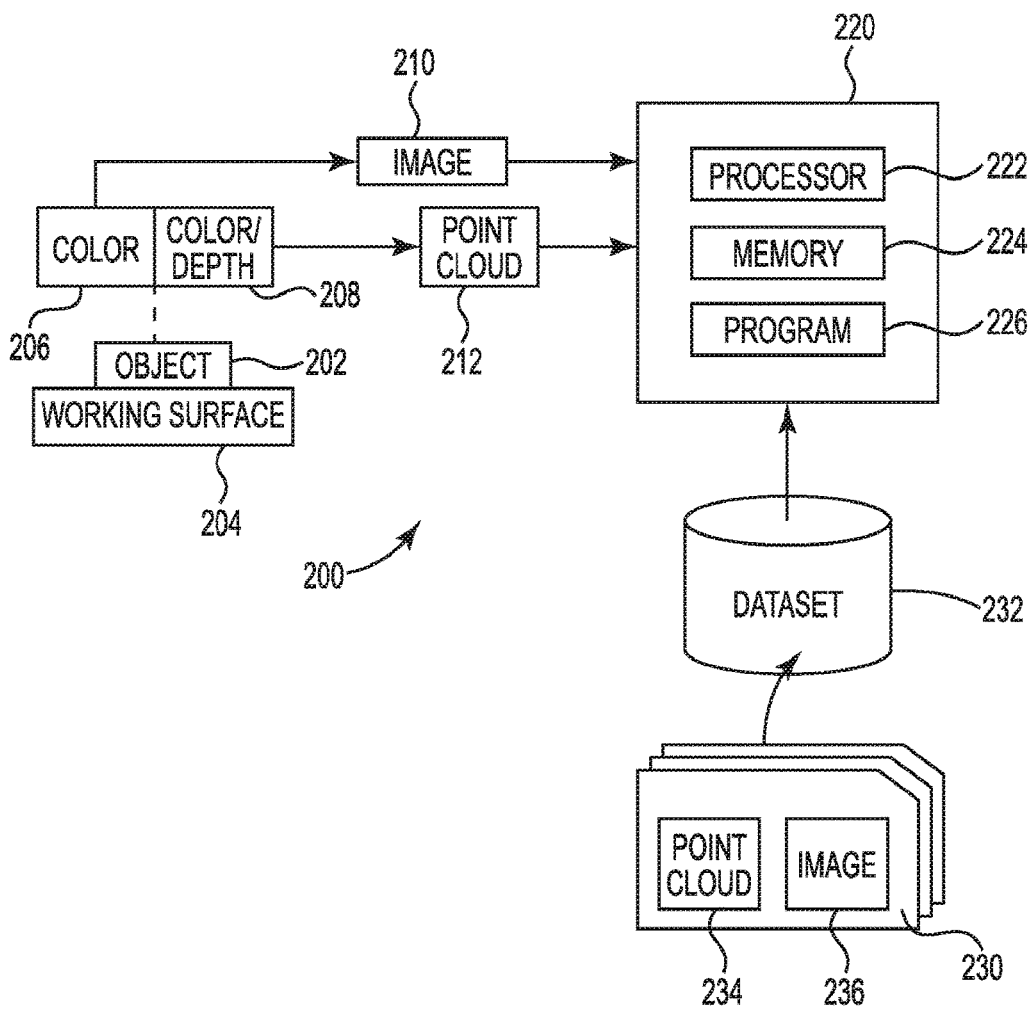
FIG. 2 is a schematic diagram illustrating example system for applying the example method of FIG. 1.

FIG. 2 illustrates an example system 200 that can apply method 100 to recognize object 202. Object 202 is placed against a working surface 204 and imaged with a color camera 206 and a color-depth camera 208. In one example, the working surface 204 is a generally planar mat having a solid neutral color, such as a white background. The color camera 206 in one example can include a generally higher resolution camera having red, green, and blue sensors, or RGB camera, that can provide color information for each pixel. The color camera 206 can generate a relatively high-resolution two-dimensional color image data 210 of the object 202. The color-depth camera 208 can include color sensors and a depth sensor to generate images of the object that are merged to form a point cloud data of the object 212. In one example, the color-depth camera 208 can include an RGB-D camera, such an example having red, green, blue, infrared sensors, to generate color and depth data for each pixel. The point cloud data of the object 212 can be formed in the color-depth camera 208 or subsequently in processing. The color sensors of the color-depth camera 208 can produce a color image of a relatively lower resolution than that with the color camera 206. In one example, the system 200 may include multiple color-depth cameras 208, which can reduce training workload and enhance matching confidence. Cameras 206, 208 and working surface 204, in one example, can have a fixed position with respect to each other and ambient lighting is generally stable or generally does not include variation during imaging.

The color image data of the object 210 and the point cloud data of the object 212 are provided to a computer system 220 having a processor 222 and memory 224 that are configured to implement an example method of this disclosure, such as method 100, as a set of computer readable instructions stored in memory 224 for controlling the processor 222 to perform a method such as method 100. In one example, the set of computer readable instructions can be implemented as a computer program 226 that can include various combinations of hardware and programming configured to operate on computing system 220. Computer program 226 can be stored in memory 224 and executed by the processor 222 to compare the color image of the object 210 and the point cloud of the object 212 against candidates 230 in a dataset 232. In the example, each candidate 230 includes a three-dimensional point cloud of the candidate 234 and a two-dimensional image of the candidate 236. In one example, each candidate 230 includes one three-dimensional point cloud of the candidate 234 and multiple two-dimensional images of the candidate 236.

Figure 3:
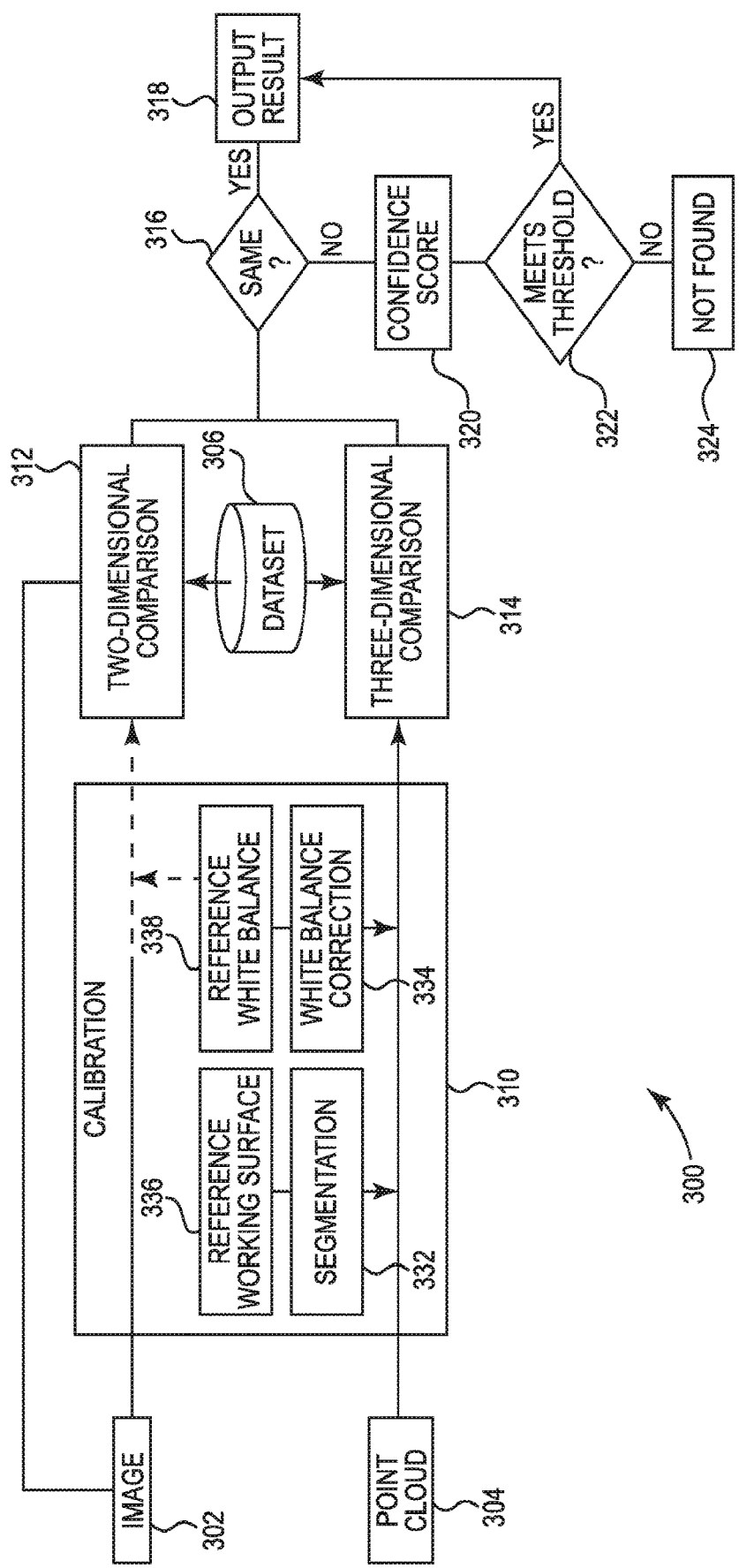
FIG. 3 is a block diagram illustrating an example implementation of the example method of FIG. 1.

FIG. 3 illustrates an example method 300, which can be an example implementation of method 100 performed with system 200. Method 300 includes receiving a two-dimensional image 302, such as color image data 210 of the object 202, and a three-dimensional image or point cloud 304, such as color-depth point cloud data 212 of the object 202, for calibration at 310. The two-dimensional image 302 is processed with two-dimensional image recognition at 312 and the calibrated three-dimensional image 304 is processed with three-dimensional object recognition at 314, which each separately compares the respective images 302, 304 against candidates in a dataset 306, such as dataset 232. Each recognition process at 312, 314 returns a candidate it considers to be the recognized object along with a corresponding confidence score. If the candidates from each recognition process at 312 and 314 are the same candidate at 316, the candidate is returned as the recognized object at 318. If the candidates are different at 316, the confidence scores are compared and the dominating confidence score is selected at 320. If the dominating confidence score meets or surpasses a threshold amount at 322, the candidate corresponding with the dominating confidence score is returned as the recognized object at 318. If, however, the confidence score does not meet the threshold amount, the method 300 outputs that the object was not recognized at 324.

Calibration at 310 can include point cloud segmentation at 332 and white balance at 334. Calibration at 310 can be initialized with a reference three-dimensional plane parameter 336 of the working surface 204 for point cloud segmentation at 332 and a reference two-dimensional color image 338 of the working surface 204 for white cloud balance at 334. Point cloud segmentation 332 includes subtracting a reference working surface 336 from the three-dimensional object point cloud 304. The reference two-dimensional image 338 is applied to perform a pixel-wise white balance on the two-dimensional image 302 of the object to generate a white-balance corrected two-dimensional image. In one example, the white-balance corrected two-dimensional image is mapped onto the three-dimensional point cloud 304 according to system 200 imaging calibration, which can include the three-dimensional transformation among the internal coordinates of the RGB-D sensors. The original two-dimensional color image 302 is provided as an input to the two-dimensional recognition 312, and, in one example, the white-balance corrected two-dimensional image is provided as an input to the two-dimensional image recognition process 312 as a calibrated two-dimensional image of the object. The segmented, white-balanced point cloud is provided as an input to the three-dimensional object recognition process at 314 as a calibrated three-dimensional point cloud of the object.

Segmentation of the object from the background or working surface at 332 can reduce computation time of the three-dimensional recognition 312. On an example of system 200, the color-depth camera 208 position and angle with respect to the working surface 204 are fixed and the working surface 204 is a generally planar mat. In one example of developing the reference working surface 336, the corners of the mat are detected and recorded via color-depth camera 208. The three-dimensional points corresponding with the mat are fitted to a three-dimensional plane and the parameters of the plane are recorded. The value of the plane along the axis to the color-depth camera, or z-axis, is subtracted from the three-dimensional point cloud of the object 304 and any remaining z value lower than a set threshold is labeled as background and ignored.

Color appearance is included in the comparisons 102, 104 of method 100. But color appearance of the object can vary under different ambient lighting conditions. In one example, the color of mat of working surface 204 is provided as white. The reference two-dimensional image 338 of the working surface 204 is captured via color camera 206 for a pixel-wise white balance. The reference two-dimensional image 338 and the reference working surface 336 can be captured at the simultaneously or separately via the color camera 206 and the color-depth camera 208. In one example, white balance is performed in the CIE XYZ color space of the International Commission of Illumination (CIE), and a transformation from the RGB color space to the CIE XYZ color space is included, such as via CIE standards and entries. The white balanced two-dimensional image is mapped onto the three-dimensional depth image 304. In one example, system geometric calibration data is used to include three-dimensional transformations among internal coordinates of the vision sensors of the color-depth camera 208.

Figure 4:
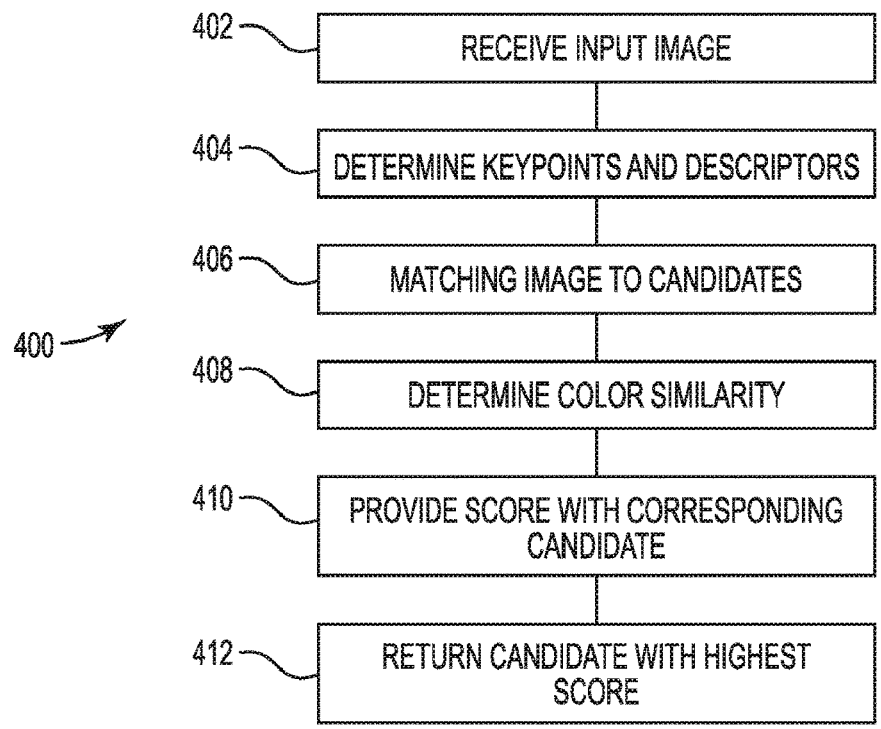
FIG. 4 is a block diagram illustrating an example feature of the example method of FIG. 1.

FIG. 4 illustrates an example method 400 of the two-dimensional recognition 312 using, for example, system 200. Method 400 receives a two-dimensional image of the object and, in some examples, a calibrated two-dimensional image of the object at 402. In one example, the method 400 can be based on local scale and orientation invariant feature transformation (SIFT). The received two-dimensional image and, in one example, a white-balance corrected two-dimensional image are processed to determine keypoints and descriptors at 404. The keypoints and descriptors of input two-dimensional image are matched with the keypoints and descriptors of the two-dimensional image of the candidate 236 at 406. In one example, keypoints are detected from grayscale versions of the two-dimensional images of the object and candidates, and descriptors are subsequently determined. The matched points are compared and a determination is made as to a color similarity between the matched keypoints at 408. A score with geometric and descriptor distances is provided for the corresponding candidate at 410. The matching 406, color appearance comparison 408, and scoring at 410 can be repeated for each two-dimensional image of the candidates in the dataset 232, or subset of the dataset 232, and the candidate with the highest score and its corresponding score, or confidence score, is output at 412.

The color similarity determination at 408 provides additional discrimination. For each keypoint characterized by its location and a circular window, in one example, an average RGB value is computed and then converted to a CIELab (L*a*b*) value. A color difference, or CIE Delta E, such as CIE DE2000, is used to measure whether a pair of keypoints is similar in color. If the Delta E of a keypoint pair exceeds a selected threshold, the match is removed.

In one example of scoring at 410, the geometric relationship of matched keypoints between the two-dimensional image of the object and a two-dimensional image of the candidate may be described via homography in two separate components on system 200. A first component is a perspective transform applied it to all images captured by the camera 206. A second component is an affine transform that is determined from the matched keypoints that may include imposed constraints in scaling and shearing factors to an affine transform. The geometric distance between matched keypoints may be computed and used for an additional verification. A maximum distance threshold can determine whether a match should be rejected under a given affine transform. For example, if the total number of geometric verified matching keypoint pairs is above a selected value, which is the minimum number of point pairs to compute an affine transform, a score for an image pair can be computed.

Figure 5:
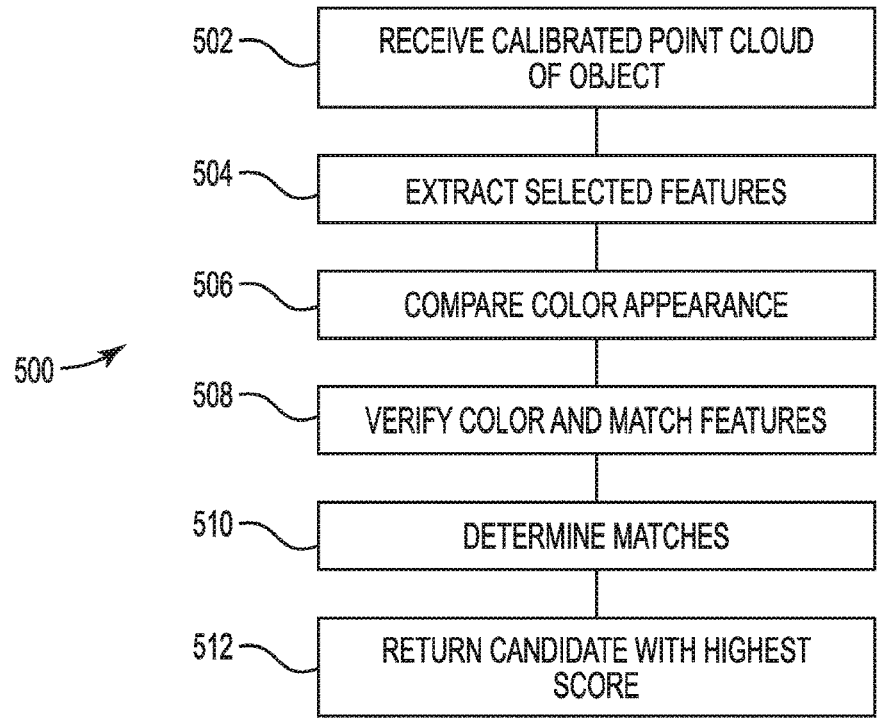
FIG. 5 is a block diagram illustrating another example feature of the example method of FIG. 1.

FIG. 5 illustrates an example method 500 of the three-dimensional recognition 314 using, for example, system 200. Method 500 receives a calibrated three-dimensional point cloud of the object at 502. In one example, each three-dimensional point cloud of each candidate are smoothed with a moving least square (MLS) filter prior to being stored in dataset 232 and the calibrated three-dimensional point cloud of the object is smoothed with the MLS filter during method 500. The calibrated three-dimensional point cloud of the object received from calibration at 310 is processed to extract selected features at 504. In one example, the particular selected features are included with each three-dimensional point cloud of the candidate 234 in dataset 232. The selected features extracted at 504 can include object color appearance, three-dimensional keypoints, three-dimensional feature and local color appearance for each keypoint.

Object color appearance is compared with color appearance of the candidates at 506. Object color appearance comparison at 506 can improve the throughput of the method 500 as it creates a smaller subset of candidates for three-dimensional comparison. In one example, the color comparison can be performed in the L*a*b* color space as it was less sensitive to lighting changes as others, such as hue-saturation histogram, hue histogram, and a*–b* channel histogram on segmented object points. The luminance channel was discarded and the average (a*, b*) was applied on segmented object points and Euclidean distance as the metric.

Three-dimensional feature matching and local color verification is performed with the point cloud of the object and the point cloud of the candidates at 508, as on the subset of candidates. Three-dimensional point features can be classified as global or local descriptors. Global descriptors can be used for objects that have been segmented well and represent the entire object point cloud with one descriptor. Local descriptors, in contrast, are computed locally around keypoints and one object point cloud typically includes several keypoints. In an example of the present method 500 in which the three-dimensional point cloud at 502 can vary from on the objet orientation and location with respect to the background, local keypoint detectors and feature descriptors are applied.

In one example, ISS (Intrinsic Shape Signatures) local keypoint detection is used to extract shape keypoints from the filtered object point cloud. ISS defines an intrinsic reference frame at a basis point with a supporting radius by using the eigenanalysis of the point scatter matrix and is a generalization of the classical surface normal reference for shape feature extraction independent of view. A SHOT (Signature of Histogram OrientaTion) feature descriptor can be extracted on the detected keypoints. The descriptor is computed using a three-dimensional spherical grid centered on the keypoint then built from the subdivision of the grid structure, and is represented in bins of a three-dimensional histogram.

In one example, an average L*a*b* color vector is calculated in its local neighborhood for each keypoint detected, which is used to verify the keypoint matching. To determine the similarity between two point clouds, feature point matching between keypoints are performed in the SHOT feature space. Compared to image feature matching, shape features can be less distinctive, especially if the RGB-D sensor data is noisy. The local average L* a* b* color vector and CIE Delta E distance are used to verify the matching points have sufficient color similarity.

Matches between the candidates and the object are determined at 510. For example, the candidates in the subset of candidates are ranked in terms of correspondence with the object. The highest ranking candidates are further processed to determine the best match along with a confidence score. In one example, a RANSAC (Random Sample Consensus) method can be applied to determine if a good transformation is found, and the subset of candidates are ranked based on the number of keypoints supporting the good transformation. In one example, an Iterative Closest Points (ICP) process is applied to further align the subset of candidates, and a selected number of top candidates, such as the top five ranking candidates, are selected. The best match can be determined from calculating the average distance of all points between the point clouds of the remaining candidates and the object point cloud. The candidate with the highest score and its corresponding score, or confidence score, is output at 512.

Methods 400 and 500 can be performed separately and preferably concurrently. If both methods 400, 500 return valid results and the candidates are different, such as method 400 returns first candidate result image $i_{r1}$ and method 500 returns second candidate result image ire, a confidence score $SC(i_q, i_r)$ is calculated between the image of the object $i_q$ and result image from each method. In one example, a confidence score $SC(i_q, i_r)$ can be determined as:

$$SC(i_q, i_r) = \frac{N_m}{K_q} \times \frac{N_m}{K_r}$$

where $N_m$ is the number of matched keypoints between image $i_q$ and $i_r$ that passed geometric verification/consistency in two-dimensional and three-dimensional approaches of methods 400, 500, $K_q$ and $K_r$ are the number of keypoints of image $i_q$ and $i_r$.

Because $N_m \leq K_q$, and $N_m \leq K_r$, $0 \leq SC(i_q, i_r) \leq 1$, the confidence score in this example is greater than or equal to zero and less than or equal to one.

If the confidence score $SC(i_q, i_{r1})$ is larger than the confidence score $SC(i_q, i_{r2})$ and a selected threshold, the final result is first candidate result image $i_{r1}$, and if the confidence score $SC(i_q, i_{r1})$ is larger than the confidence score $SC(i_q, i_{r1})$ and a selected threshold, the final result is second candidate result image $i_{r2}$. Otherwise, the output can be set to not found, such as at 324.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method of recognizing an object, comprising:
   comparing a three-dimensional point cloud of the object to a three-dimensional candidate from a dataset to determine a first confidence score, the point cloud including a color appearance calibrated from a white balance image and the comparing including comparing the color appearance of the object with the three-dimensional candidate;
   comparing color metrics of a two-dimensional image of the object to a two-dimensional candidate from the dataset to determine a second confidence score; and
   selecting one of the first and second confidence scores to determine which of the three-dimensional candidate or the two-dimensional candidate corresponds with the object.

2. The method of claim 1 wherein the selecting includes selecting one of the first and second confidence scores if the three-dimensional candidate and the two-dimensional candidate do not both correspond with the object.

3. The method of claim 1 wherein the selected one of the first and second confidence scores at least meets a threshold.

4. The method of claim 1 wherein the comparing color metrics includes comparing local color keypoints.

5. The method of claim 4 wherein the first and second confidence scores are based on keypoints.

6. The method of claim 1 wherein the comparing the three-dimensional point cloud of the object and comparing color metrics of a two-dimensional image of the object are performed concurrently.

7. A non-transitory computer readable medium to store computer executable instructions to control a processor to:
   generate a white balance calibration against a surface;
   compare a three-dimensional point cloud of an object to be recognized against a three-dimensional candidate, the point cloud including a color appearance determined from the white balance calibration;
   compare color metrics of a two-dimensional image of the object to a two-dimensional candidate; and
   select one of the three-dimensional candidate and the two-dimensional candidate to determine which of the three-dimensional candidate or the two-dimensional candidate corresponds with the object.

8. The computer readable medium of claim 7 wherein the surface is a planar mat.

9. The computer readable medium of claim 7 wherein the selected one of the three-dimensional candidate and the two-dimensional candidate is based on confidence scores.

10. The computer readable medium of claim 7 wherein the point cloud includes a segmentation against the surface.

11. The computer readable medium of claim 7 wherein a subset of candidates is generated from a color appearance comparison.

12. The computer readable medium of claim 11 wherein the subset of candidates are ranked in terms of correspondence with the object.

13. A system, comprising:
   memory to store a set of instructions; and
   a processor to execute the set of instructions to:
      compare a three-dimensional point cloud of the object to a three-dimensional candidate from a dataset to determine a first confidence score, the point cloud including a color appearance calibrated from a white balance image and the comparing including comparing the color appearance of the object with the three-dimensional candidate;
      compare color metrics of a two-dimensional image of the object to a two-dimensional candidate from the dataset to determine a second confidence score; and
      select one of the first and second confidence scores to determine which of the three-dimensional candidate or the two-dimensional candidate corresponds with the object.

14. The system of claim 13 comprising a color camera and color-depth camera operably coupled to the processor.

15. The system of claim 14 wherein the color camera is configured to generate the two-dimensional image of the object and the color-depth camera is configured to generate the three-dimensional point cloud of the object.

* * * * *